May 17, 1927.

J. H. WELLS 1,628,939

VARIABLE SPEED MECHANISM

Filed Sept. 24, 1925

INVENTOR.
J. H. Wells.
BY J. Edward Maybee.
ATTY.

Patented May 17, 1927.

1,628,939

UNITED STATES PATENT OFFICE.

JOHN HARRY WELLS, OF BOSTON, MASSACHUSETTS, ASSIGNOR TO MULTISIZE ROTARY PRESS CO., LIMITED, OF TORONTO, CANADA.

VARIABLE-SPEED MECHANISM.

Application filed September 24, 1925, Serial No. 58,433, and in Canada September 30, 1925.

This invention relates to variable speed mechanism which may be used in imparting motion to the cylinders of a printing press adapted for printing, without waste of paper, many different sizes of work as disclosed in my prior co-pending application, Serial No. 7,028, filed February 5th, 1925.

In this mechanism the cylinders are rotated at a constant speed while printing and at a different speed while not printing. This is accomplished by means including a speed-varying member adapted to be rotated on its axis during one portion of each revolution of the whole mechanism and to be locked during the other portion of each revolution while the cylinders are printing. It is important that the speed-varying member be so locked during the printing or constant speed period that it cannot have any effect in producing any irregularity in the speed and thus in the printing. This was accomplished in my prior application by means of a plurality of rollers two of which were adapted to engage the concentric portion of a cam during the constant speed period but in practice one of the two contacting rollers was swung forcibly against the cam which resulted in an unpleasant noise during the operation of the machine and which was apt to result in the parts being damaged. My object is therefore to provide means for gradually absorbing the momentum of the speed-varying member at the end of the period of different speed and for locking it during the period of constant speed which will be free from the above objectionable features.

I attain my objects by means of the constructions hereinafter described and illustrated in the accompanying drawings in which—

Fig. 1 is a cross section of part of the mechanism;

Fig. 2 a longitudinal section on the line 2—2 in Fig. 1; and

Fig. 3 a diagrammatic view showing three positions of the speed-varying member and two positions of its locking member.

In the drawings like numerals of reference indicate corresponding parts in the different figures.

1 is a constant speed shaft which is suitably journalled in bearings (not shown) carried by the frame of the machine. 5 is a rotary driven member formed as a sleeve loosely mounted on the constant speed shaft 1. It is the function of the apparatus or mechanism as a whole to actuate this rotary member at the same speed as the shaft 1 for a portion of each revolution and at a varied speed during the remainder of each revolution. The rotary driven member 5, by any suitable gearing may be used to actuate any desired mechanism or machine, such, for example, as the cylinder or cylinders of a printing press.

On the shaft 1 is secured a carrying member including a gear 7 which is driven in any suitable manner. A spindle $7^c$, journalled eccentric to the shaft 1 in the carrying member, has at its outer end a speed-varying member 8 secured thereto. The inner end of this spindle is geared by means of change gears to the rotary member 5. In Fig. 2 is shown a simple form of change gears in which a gear $7^d$ is removably secured to the spindle $7^c$ and is meshed with a gear 40 secured to the rotary driven member 5. A preferred form of this gearing and the gearing for connecting the rotary member with a printing press is shown and fully described in my hereinbefore mentioned prior application.

If the spindle $7^c$ be held from rotation relative to the carrying member 7, the rotary driven member 5 will be actuated at the same speed as the constant speed shaft 1, whereas if the spindle $7^c$ be rotated on its axis, the rotary member will be actuated relative to the constant speed shaft.

The spindle $7^c$ is intermittently rotated on its axis during a portion of each revolution of the constant speed shaft 1 and thus of the carrying member 7. The speed-varying member 8 is formed as a hub secured to the spindle $7^c$ and has a plurality of ratchet teeth 10 formed on its periphery, see Fig. 1. In the drawings there are four equally spaced teeth shown which are adapted to be engaged seriatim by a spring actuated pawl 11 pivoted on an oscillatable member 12 journalled on the member 8. Preferably there are two diametrically opposite pawls 11 employed for engaging two of the teeth 10 at the same time to equalize the load on opposite sides of the spindle $7^c$. The oscillatable member is provided with a laterally extending projection $12^a$ having an anti-friction roller thereon for engagement with a cam groove formed in the side of a cam disk 110

14. This cam is adapted to oscillate the member 12 to cause the pawls to partially rotate the speed-varying member and to return the pawls to their starting position for engagement with the next pair of ratchet teeth on the next revolution of the constant speed shaft. In Fig. 1 the starting and finishing positions of the speed-varying and oscillatable members are shown in full and in construction lines respectively, and it will be noted that the rotary movement imparted to the spindle $7^c$ takes place during a portion less than half of a revolution of the constant speed shaft 1.

In other words, the stepwise rotary movement is imparted to the speed-varying member during one portion of each revolution of the carrying member and the two rotate together for the other portion or the remainder of each revolution during the constant speed period of the mechanism as a whole.

The cam 14 is mounted on a sleeve journalled on the constant speed shaft 1 and is formed integral with or secured to a gear $14^f$ which has a driving connection with the shaft by means of changeable gears (not shown) so that the speed of the cam and its direction of rotation may be varied relative to the speed and direction of rotation of the shaft.

While the speed-varying member 8 is being carried through the arc in which all the parts of the mechanism travel at a uniform speed, it is desirable to positively lock the member 8 to prevent the rotary driven member 5 moving relative to the constant speed shaft 1. In the drawings the cam 14 is designed to actuate the speed-varying member a one-quarter revolution during each revolution of the carrying-member 7, but variations of this arc of movement might be employed by changing the shape of the cam to increase or decrease the arc of the speed-varying member and by changing the gear ratios to correspond. In any case, to obtain good printing results it is necessary to control the movement of the speed-varying member for substantially its whole rotary movement and then lock it as mentioned above.

This is accomplished by first controlling the movement of the speed-varying member and then positively locking it as hereinafter described. A control cam $14^g$ is secured to the cam 14, the former being formed integral with the sleeve to which the cam 14 is secured and the speed-varying member 8 is provided with four equally spaced projections carrying anti-friction rollers $8^a$, $8^b$, $8^c$ and $8^d$ adapted to engage the underside surface $14^h$ of a radially extending nose on the control cam. Referring to Figs. 1 and 3, it will be seen that at the commencement of the rotary movement of the speed-varying member, shown in full lines Fig. 1 and dotted lines in Fig. 3, the roller $8^a$ is adjacent the control cam. As the carrying member 7 rotates past the cam 14, its projection $12^a$ on the oscillatable member is swung away from the shaft 1 to impart the rotary movement to the speed-varying member. The roller $8^a$ is thus swung away from the control cam and the roller $8^b$ travels in towards the cam. As the rotary movement of the speed varying member progresses the member is partially turned with the spindle $7^c$ and the roller $8^b$ engages the surface $14^h$ when the spindle reaches the position indicated in construction lines in Fig. 3.

It will be noted that the roller $8^b$ in this intermediate position is still ahead of the spindle $7^c$ and the roller is adapted to roll along the surface $14^h$, while the spindle is turning through the last part of its partial rotation, to gradually absorb the momentum of the revolving speed-varying member 8 and to prevent it overrunning its pawl and ratchet drive. The oscillatable member 12 is first moved very slowly by the cam from the position indicated in full lines in Fig. 1, as hereinbefore described, then the speed is increased and then gradually decreased towards the end of its work stroke whereby the pawls 11 are substantially at rest when the member 12 has reached the end of its work stroke which position is indicated in dotted lines in Fig. 1. The speed-varying member 8 tends to overrun its ratchet drive when the speed of the member 12 is decreased and the roller $8^b$ is adapted to engage the cam $14^g$ before the reduction in speed of the member 12 takes place so that the roller $8^b$ is controlled by the cam before the member 8 has an opportunity to run ahead of its ratchet drive. The surface $14^h$ is so shaped that the roller $8^b$ in contact therewith holds the teeth 10 in contact with the pawls 11 so that the speed of the speed-varying member 8 is gradually slowed down with the oscillatable member 12 and the member 8 is substantially at rest when it reaches the end of its partial revolution.

When the member 8 reaches this position the roller $8^b$ has reached the end of the surface $14^h$ as indicated in full lines, Fig. 3, and is locked by means of a yoke 4, pivoted at $7^f$ on the carrying member 7, while the mechanism as a whole travels through the arc of constant speed. The yoke is located between the cam $14^g$ and the carrying member 7 and is provided with a recess $4^a$ to form spaced shoulders adapted to receive the rollers $8^a$, $8^b$, $8^c$ and $8^d$ seriatim. To position the yoke for engagement with the hereinbefore described rollers, I provide rollers $14^j$ arranged concentric with the axis of and carried by the cam $14^g$ for engagement with the inner curved surface of the yoke 4. This surface is provided with a portion $4^b$ which is concentric to the axis of the cam 14ᵍ and thus to the rollers 14ʲ when the yoke is in locking position, whereby the latter will maintain the yoke in locking position during the period of constant speed. Referring to the full lines in Fig. 3 it will be noted that the forward part of the concentric portion 4ᵇ has just engaged the first roller 14ʲ and the yoke has been swung into locking engagement with the roller 8ᵇ. As the shaft 1, carrying member 7, yoke 4, spindle 7ᶜ, and speed-varying member 8 rotate past the cams 14 and 14ᵍ and the rollers 14ʲ, the concentric portions 4ᵇ engages the other rollers 14ʲ in turn. This arrangement permits a roller to be positioned near the points of locking and unlocking whereby the yoke will be adequately supported as it moves from the locking to the unlocking points. The radius of the inner curved surface of the yoke between the ends of the concentric portion 4ᵇ is greater than the radius of the latter which permits the yoke to disengage the locked roller on the speed-varying member when the end of the concentric portion passes the last roller 14ʲ which is the one adjacent the unlocking position as hereinbefore described.

To prevent the yoke 4 being jammed between the cam 14ᵍ and the carrying member 7, I provide a distance collar 6 between the cam and member. This collar is formed on a bushing on which the cam is mounted and is suitably shaped to provide sufficient material so it may be pinned to the cam and to clear the rollers 14ʲ.

The mode of operation, assuming the spindle 7ᶜ is positioned as shown in dotted lines in Fig. 3 and has just completed the arc of constant speed, is as follows. As the carrying member rotates past this point the rollers 8ᵃ, 8ᵇ, 8ᶜ and 8ᵈ on the speed-varying member are rotated about the spindle 7ᶜ and at the same time the concentric portions 4ᵇ of the yoke 4 is moved past the last roller 14ʲ which permits the shoulders 4ᵃ to drop away from the roller 8ᵃ. The spindle 7ᶜ, rollers on the speed varying member and the yoke travel round to the position indicated in construction lines, in this position the roller 8ᵃ has been swung to the rear of the spindle 7ᶜ.

To tend to position the yoke for engagement with the rollers 8ᵃ to 8ᵈ, one by one, on successive rotations of the carrying member, I provide spring means carried by the carrying member 7 for engagement with an arm 4ᶜ formed on the side of the yoke remote from its pivot 7ᶠ. The spring means includes a stem 4ᵈ pivoted at 7ᵍ on the carrying member and freely passed through the arm 4ᶜ. Springs 4ᵉ are carried on the stem for engaging opposite sides of the arm, one spring being stronger than the other whereby the periphery of the yoke is yieldingly pressed against one of the rollers as the rollers are changing their positions which prevents the yoke "flopping" about.

As the spindle 7ᶜ moves from the position indicated in construction lines to that indicated in full lines, the roller 8ᵇ rolls along the surface 14ʰ and slows down the speed of the members 8 and 5 and at the same rate as the cam 14 slows down the speed of the oscillatable member 12. The forward end of the concentric portion 4ᵇ then engages the first roller 14ʲ and holds the shoulders 4ᵃ in engagement with the roller 8ᵇ during the movement through the constant speed arc. It will be noted that the surface 14ʰ is the only part of the cam engaged by the rollers 8ᵃ to 8ᵈ.

The above described controlling and locking mechanism will work quietly and without danger of damage to the parts and will positively lock the speed varying member during the period of constant speed so that high class work may be produced by the apparatus.

What I claim is:

1. In variable speed mechanism the combination of a rotary driven member; a rotatably mounted carrying member; a speed-varying member journaled on said carrying member eccentric to the axis thereof; gearing between said speed-varying member and the driven member; means including a ratchet device for imparting a stepwise rotary movement to the speed-varying member during one portion of each revolution of the carrying member whereby the speed of the rotary driven member is varied relative to the speed of the carrying member; means including a cam adapted to co-operate with the speed-varying member to gradually absorb the momentum thereof at the end of its partial revolution; and means for positively locking the speed-varying member from rotation on its axis during the other portion of each revolution of the carrying member while the speed varying member is not being moved by the ratchet device.

2. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; and a cam engageable by the projections, seriatim, for checking the momentum of the speed-varying member during its movement relative to the carrying member.

3. In variable speed mechanism the combination of a rotary driven member; a rotatably mounted carrying member; a speed-varying member journalled on said carrying member eccentric to the axis thereof; gearing between said speed-varying member and the driven member; means including a ratchet device for imparting a stepwise rotary movement to the speed-varying member during one portion of each revolution of the carrying member whereby the speed of the rotary driven member is varied relative to the speed of the carrying member; a plurality of equally spaced projections on the speed-varying member; and a cam engageable by the projections, seriatim, for checking the momentum of the speed-varying member during its movement relative to the carrying member to prevent the speed-varying member running ahead of its ratchet drive.

4. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; a cam engageable by the projections, seriatim, for checking the momentum of the speed-varying member during its movement relative to the carrying member; and means adapted to engage the projections, one by one, to lock the speed-varying member during the other portion of each revolution of the carrying member.

5. In variable speed mechanism the combination of a rotary driven member; a rotatably mounted carrying member; a speed-varying member journalled on said carrying member eccentric to the axis thereof; gearing between said speed-varying member and the driven member; a cam; an oscillatable member journalled concentric with the speed-varying member and actuable by said cam; pawl and ratchet driving means whereby a stepwise rotary movement may be imparted to the speed-varying member by the rocking of the oscillatable member to vary the speed of the rotary driven member relative to the speed of the carrying member; and means including a cam adapted to co-operate with the speed-varying member to gradually absorb the momentum thereof at the end of its partial revolution.

6. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; a cam engageable by the projections, seriatim, for checking the momentum of the speed-varying member during its movement relative to the carrying member; a pivoted member adapted to engage the projections, one by one, to lock the speed-varying member during the other portion of each revolution of the carrying member; and means adapted to lock the pivoted member in its operative position.

7. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; a pivoted member adapted to engage the projections, seriatim, to lock the speed-varying member during the other portion of each revolution of the carrying member; and means adapted to lock the pivoted member in its operative position.

8. In variable speed mechanism the combination of a constant speed shaft; a rotary driven member loose on the said shaft; a carrying member secured to the shaft; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the shaft; a plurality of equally spaced projections on the speed-varying member; and means including a pivoted yoke adapted to span the said shaft and provided with spaced shoulders adapted to receive the projections, seriatim, to lock the speed-varying member during the other portion of each revolution of the carrying member.

9. In variable speed mechanism the combination of a constant speed shaft; a rotary driven member loose on the said shaft; a carrying member secured to said shaft; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the constant speed shaft; a plurality of equally spaced projections on the speed-varying member; a pivoted yoke adapted to span the said shaft and provided with a recess to form spaced shoulders adapted to receive the projections, seriatim, to lock the speed-varying member during the other portion of each revolution of the carrying member; means adapted to lock the yoke in its operative position; and spring means connected with the carrying member and the yoke tending to position the latter for engagement with a projection.

10. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; a cam engageable by the projections, seriatim, for checking the momentum of the speed-varying member during its movement relative to the carrying member; a pivoted yoke provided with spaced shoulders adapted to receive the projections, one by one; and means for operating the yoke into and out of engagement with the projections to lock and unlock the speed-varying member during each revolution of the carrying member.

11. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; a cam concentric with the carrying member engageable by the projections, seriatim, for checking the momentum of the speed-varying member during its movement relative to the carrying member; a plurality of rollers carried by the cam, concentric to its axis; and a yoke pivoted on the carrying member and passed over the rollers, the yoke having spaced shoulders adapted to receive the projections, one by one, the yoke being provided with an arcuate surface concentric to the axis of the cam for engagement by the rollers, seriatim, to maintain the yoke in locking engagement with the projections during the other portion of each revolution of the carrying member.

12. In variable speed mechanism the combination of a rotary driven member; a rotatably mounted carrying member; a speed-varying member journalled on said carrying member eccentric to the axis thereof; gearing between said speed-varying member and the driven member; means for imparting a stepwise rotary movement to the speed-varying member during one portion of each revolution of the carrying member whereby the speed of the rotary driven member is varied relative to the speed of the carrying member; a plurality of equally spaced projections on the speed-varying member; a cam concentric with the carrying member engageable by the projections, seriatim, for checking the momentum of the speed-varying member during its movement relative to the carrying member; a plurality of rollers carried by the cam, concentric to its axis; a yoke pivoted on the carrying member and passed over the rollers, the yoke having spaced shoulders adapted to receive the projections, one by one, the yoke being provided with an arcuate surface concentric to the axis of the cam for engagement by the rollers, seriatim, to maintain the yoke in locking engagement with the projections during the other portion of each revolution of the carrying member; and spring means connected with the carrying member and the yoke tending to position the latter for engagement with a projection.

13. In variable speed mechanism the combination of a rotary driven member; a rotatably mounted carrying member; a speed-varying member journalled on said carrying member eccentric to the axis thereof; gearing between said speed-varying member and the driven member; a cam concentric with the carrying member; an oscillatable member journalled concentric with the speed-varying member and actuable by said cam; pawl and ratchet driving means whereby a stepwise rotary movement may be imparted to the speed-varying member by the rocking of the oscillatable member; a plurality of equally spaced projections on the speed-varying member; a cam concentric with and secured to the first mentioned cam and engageable by the projections, seriatim, for checking the momentum of the speed-varying member to prevent the latter overrunning the pawl and ratchet drive; a plurality of rollers carried by the second mentioned cam concentric to its axis; and a yoke pivoted on the carrying member and passed over the rollers, the yoke having spaced shoulders adapted to receive the projections, one by one, the yoke being provided with an arcuate surface concentric to the axis of the cam for engagement by the rollers, seriatim, to maintain the yoke in locking engagement with the projections while the speed-varying member is not being moved by the oscillatable member and thereby lock said member from rotation.

14. In variable speed mechanism the combination of a rotary driven member; a rotatably mounted carrying member; a speed-varying member journalled on said carrying member eccentric to the axis thereof; gearing between said speed-varying member and the driven member; a cam concentric with the carrying member; an oscillatable member journalled concentric with the speed-varying member and actuable by said cam; pawl and ratchet driving means whereby a stepwise rotary movement may be imparted to the speed-varying member by the rocking of the oscillatable member; a plurality of equally spaced projections on the speed-varying member; a cam concentric with and secured to the first mentioned cam and provided with a radially extending nose the underside of which is adapted to be engaged by the projections, one by one, as the speed-varying member is being turned on its axis through substantially the last part of its partial rotation to prevent the said member overrunning its pawl and ratchet drive; a plurality of rollers carried by the second mentioned cam concentric to its axis; and a yoke pivoted on the carrying member and passed over the rollers, the yoke having spaced shoulders adapted to receive the projections, one by one, the yoke being provided with an arcuate surface concentric to the axis of the cam for engagement by the rollers, seriatim, to maintain the yoke in locking engagement with the projections while the speed-varying member is not being moved by the oscillatable member and thereby lock the speed-varying member from rotation.

Signed at Toronto this 20th day of August, 1925.

J. HARRY WELLS.